United States Patent
Bhaskaran

(10) Patent No.: US 9,767,807 B2
(45) Date of Patent: Sep. 19, 2017

(54) DIGITAL VOICE SIGNATURE OF TRANSACTIONS

(71) Applicant: Ack3 Bionetics Pte Limited, Singapore (SG)

(72) Inventor: Sajit Bhaskaran, Sunnyvale, CA (US)

(73) Assignee: Ack3 Bionetics Pte Limited, Singapore (SG)

( * ) Notice: Subject to any disclaimer, the term of this patent is extended or adjusted under 35 U.S.C. 154(b) by 67 days.

(21) Appl. No.: 14/644,129

(22) Filed: Mar. 10, 2015

(65) Prior Publication Data

US 2015/0187359 A1 Jul. 2, 2015

Related U.S. Application Data

(63) Continuation-in-part of application No. 13/076,261, filed on Mar. 30, 2011.

(60) Provisional application No. 61/950,729, filed on Mar. 10, 2014.

(51) Int. Cl.
  *G10L 15/00* (2013.01)
  *G10L 17/24* (2013.01)
  *G07C 9/00* (2006.01)
  *G10L 15/26* (2006.01)

(52) U.S. Cl.
  CPC .......... *G10L 17/24* (2013.01); *G07C 9/00071* (2013.01); *G10L 15/26* (2013.01)

(58) Field of Classification Search
  None
  See application file for complete search history.

(56) References Cited

U.S. PATENT DOCUMENTS

| | | | |
|---|---|---|---|
| 4,783,804 A | 11/1988 | Juang et al. | |
| 5,247,497 A | 9/1993 | Cohn | |
| 5,311,594 A | 5/1994 | Penzias | |
| 5,509,104 A | 4/1996 | Lee et al. | |

(Continued)

FOREIGN PATENT DOCUMENTS

KR  100418113 B1  2/2004

OTHER PUBLICATIONS

Calhoun, et al., Diameter Base Protocol (Diameter), Internet RFC 3588, published by IETF,148 pgs, 2003.

(Continued)

*Primary Examiner* — Fariba Sirjani
(74) *Attorney, Agent, or Firm* — McDermott Will & Emery LLP

(57) ABSTRACT

A method that includes receiving, by a server, an access request sent to a network address of a resource server from a user using a user device, the access request comprising a unique record identifier is provided. The method includes placing a call to the user device, receiving from the user a voice response to a prompt associated with an implied security question for the user, comparing the voice response of the user with a selected voice biometrics record, converting the voice response into a speech-to-text phrase, and comparing the speech-to-text phrase against a stored secret text phrase to verify that the speech-to-text phrase matches an answer to the silent security question. A method for signing a transaction, including collecting a plurality of voice samples from a user during a transaction and concatenating the plurality of voice samples into a single sound file is also provided.

13 Claims, 10 Drawing Sheets

(56) References Cited

U.S. PATENT DOCUMENTS

| | | | |
|---|---|---|---|
| 5,774,525 A | 6/1998 | Kanevsky et al. | |
| 5,825,871 A | 10/1998 | Mark | |
| 5,848,130 A | 12/1998 | Rochkind | |
| 6,154,526 A | 11/2000 | Dahlke et al. | |
| 6,219,407 B1 | 4/2001 | Kanevsky et al. | |
| 6,256,737 B1 | 7/2001 | Bianco et al. | |
| 6,799,163 B2 | 9/2004 | Nolan | |
| 6,995,689 B2 | 2/2006 | Crank | |
| 7,110,987 B2 | 9/2006 | Engelhart | |
| 7,269,563 B2 | 9/2007 | Douros | |
| 7,310,734 B2 | 12/2007 | Boate et al. | |
| 7,333,798 B2 | 2/2008 | Hodge | |
| 7,383,572 B2 | 6/2008 | Rolfe | |
| 7,536,304 B2 | 5/2009 | Di Mambro et al. | |
| 7,573,993 B2 | 8/2009 | Bookstaff | |
| 7,620,037 B1 | 11/2009 | Bhaskaran et al. | |
| 7,636,855 B2 | 12/2009 | Applebaum et al. | |
| 7,881,446 B1 | 2/2011 | Apple et al. | |
| 7,917,949 B2 | 3/2011 | Conley | |
| 8,130,677 B2 | 3/2012 | Barker et al. | |
| 8,130,929 B2 | 3/2012 | Wilkes et al. | |
| 8,185,646 B2 | 5/2012 | Headley | |
| 8,255,223 B2 | 8/2012 | Wang | |
| 8,255,318 B2 | 8/2012 | Royyuru | |
| 8,407,112 B2 | 3/2013 | Walter | |
| 8,428,227 B2 | 4/2013 | Angel et al. | |
| 8,442,824 B2 | 5/2013 | Aley-Raz et al. | |
| 8,510,225 B2 | 8/2013 | Yach et al. | |
| 8,533,118 B2 | 9/2013 | Weller et al. | |
| 8,595,804 B2 | 11/2013 | Pratt et al. | |
| 8,985,442 B1* | 3/2015 | Zhou | G06Q 30/02 235/375 |
| 9,412,381 B2 | 8/2016 | Bhaskaran | |
| 9,602,508 B1* | 3/2017 | Mahaffey | H04L 63/0869 |
| 2001/0049785 A1 | 12/2001 | Kawan et al. | |
| 2002/0006133 A1 | 1/2002 | Kakemizu et al. | |
| 2002/0087857 A1* | 7/2002 | Tsao | G06F 21/32 713/155 |
| 2002/0147914 A1 | 10/2002 | Arnold | |
| 2002/0177433 A1 | 11/2002 | Bravo et al. | |
| 2003/0046083 A1* | 3/2003 | Devinney, Jr. | G06Q 20/00 704/273 |
| 2003/0081738 A1 | 5/2003 | Kohnle et al. | |
| 2003/0084289 A1 | 5/2003 | Watanabe | |
| 2003/0095644 A1* | 5/2003 | St-Onge | H04M 3/42 379/88.17 |
| 2003/0163739 A1* | 8/2003 | Armington | G06F 21/32 726/3 |
| 2003/0235308 A1* | 12/2003 | Boynton | H04L 12/5895 380/270 |
| 2004/0172536 A1* | 9/2004 | Malville | H04L 63/0428 713/169 |
| 2004/0236694 A1 | 11/2004 | Tattan et al. | |
| 2006/0021057 A1 | 1/2006 | Risan et al. | |
| 2006/0106605 A1 | 5/2006 | Saunders et al. | |
| 2006/0136219 A1 | 6/2006 | Wang | |
| 2006/0155549 A1 | 7/2006 | Miyazaki | |
| 2006/0230454 A1 | 10/2006 | Achanta et al. | |
| 2006/0245576 A1 | 11/2006 | Henry | |
| 2006/0282680 A1 | 12/2006 | Kuhlman et al. | |
| 2007/0032240 A1* | 2/2007 | Finnegan | H04M 1/72513 455/445 |
| 2007/0082706 A1* | 4/2007 | Campbell | B60R 16/0373 455/563 |
| 2007/0174080 A1 | 7/2007 | Outwater | |
| 2007/0185718 A1 | 8/2007 | Di Mambro et al. | |
| 2007/0253353 A1 | 11/2007 | Korus | |
| 2007/0277230 A1* | 11/2007 | Hawkins | H04L 63/08 726/4 |
| 2008/0155659 A1 | 6/2008 | Gazier et al. | |
| 2008/0288785 A1* | 11/2008 | Rao | G06F 21/72 713/190 |
| 2009/0006856 A1 | 1/2009 | Abraham et al. | |
| 2009/0153292 A1 | 6/2009 | Farb | |
| 2009/0210141 A1* | 8/2009 | Young | G08G 1/0104 701/119 |
| 2009/0252063 A1 | 10/2009 | Owen et al. | |
| 2009/0279436 A1 | 11/2009 | Chin et al. | |
| 2009/0292619 A1 | 11/2009 | Kagan et al. | |
| 2009/0313165 A1 | 12/2009 | Walter | |
| 2010/0115607 A1 | 5/2010 | Pratt et al. | |
| 2010/0132043 A1* | 5/2010 | Bjorn | G06F 21/41 726/25 |
| 2010/0161993 A1* | 6/2010 | Mayer | G06F 21/64 713/178 |
| 2011/0023103 A1* | 1/2011 | Dietrich | G06F 21/31 726/9 |
| 2011/0035604 A1* | 2/2011 | Habraken | G06F 21/32 713/193 |
| 2011/0145150 A1* | 6/2011 | Onischuk | G06Q 30/08 705/50 |
| 2011/0154452 A1 | 6/2011 | Novack et al. | |
| 2011/0178931 A1 | 7/2011 | Kia | |
| 2011/0246196 A1 | 10/2011 | Bhaskaran | |
| 2012/0019379 A1* | 1/2012 | Ben Ayed | G08B 13/1436 340/539.1 |
| 2012/0078639 A1 | 3/2012 | Kumar | |
| 2012/0114118 A1* | 5/2012 | Verma | H04L 9/088 380/42 |
| 2012/0144464 A1* | 6/2012 | Fakhrai | G06F 21/41 726/6 |
| 2012/0149330 A1* | 6/2012 | Watson | H04W 12/06 455/411 |
| 2012/0166270 A1* | 6/2012 | Coppinger | G06Q 30/0239 705/14.36 |
| 2012/0225634 A1* | 9/2012 | Gee | H04L 67/12 455/404.2 |
| 2013/0058474 A1 | 3/2013 | Claudatos et al. | |
| 2013/0096916 A1* | 4/2013 | Pemmaraju | G06F 21/32 704/235 |
| 2013/0097682 A1 | 4/2013 | Zeljkovic et al. | |
| 2013/0103946 A1* | 4/2013 | Binenstock | H04L 63/0492 713/168 |
| 2013/0132091 A1* | 5/2013 | Skerpac | G10L 17/005 704/273 |
| 2013/0263233 A1* | 10/2013 | Dinha | H04W 12/06 726/5 |
| 2013/0291056 A1* | 10/2013 | Gaudet | H04W 12/06 726/1 |
| 2013/0347129 A1 | 12/2013 | Samuelsson et al. | |
| 2014/0114780 A1* | 4/2014 | Menefee | G06Q 20/20 705/21 |
| 2014/0213187 A1* | 7/2014 | Lee | G01S 5/02 455/41.2 |
| 2014/0247926 A1* | 9/2014 | Gainsboro | H04M 3/2281 379/88.01 |
| 2014/0273858 A1* | 9/2014 | Panther | A61B 5/0002 455/41.2 |
| 2014/0282994 A1* | 9/2014 | Dietrich | G06F 21/34 726/9 |
| 2014/0325220 A1* | 10/2014 | Tunnell | G06F 21/00 713/168 |
| 2014/0331048 A1* | 11/2014 | Casas-Sanchez | H04L 43/0858 713/168 |
| 2015/0050977 A1* | 2/2015 | Omar | G06Q 20/0457 463/17 |
| 2015/0082025 A1* | 3/2015 | Deshpande | H04L 9/0847 713/155 |
| 2015/0095222 A1* | 4/2015 | Narendra | G06Q 20/3278 705/41 |
| 2015/0119071 A1* | 4/2015 | Basha | H04W 64/00 455/456.1 |
| 2015/0156328 A1* | 6/2015 | Arslan | G06F 21/42 379/88.02 |
| 2015/0187359 A1* | 7/2015 | Bhaskaran | G10L 17/24 704/235 |
| 2015/0256967 A1* | 9/2015 | Shin | H04W 4/008 370/254 |
| 2015/0334523 A1* | 11/2015 | Lappetelainen | H04W 4/021 455/456.1 |

(56) References Cited

U.S. PATENT DOCUMENTS

2016/0048640 A1\* 2/2016 Chung .................. G06F 19/322
                                                                                                                  705/3
2016/0212572 A1\* 7/2016 Tang ..................... H04W 8/005
2016/0295358 A1\* 10/2016 Cariss .................. H04W 4/008

OTHER PUBLICATIONS

Rigney, et al., Remote Authentification Dial in User Service (RADIUS), Jun. 2000, published by IETF, 77 pgs.
Rosenburg, et al., Best Current Practices for Third Party Call Control, http://tools.ietf.org/html/rfc3725, Apr. 2004.
Ulanoff, Iphone Multitasking, Where you at ?, http://www.pcmag.com/article2/0,2817,2343381,00.asp, Mar. 18, 2009, 2 pgs.
"What is IVR (how to implement an IVR)," <http://www.asteriskguru.com/tutorials/ivr.html>, 2007.
International Search Report and Written Opinion dated Nov. 1, 2016, which issued in International Application No. PCT/US2016/021011.

\* cited by examiner

DIGITAL VOICE SIGNATURE OF TRANSACTIONS

CROSS-REFERENCE TO RELATED APPLICATIONS

The present application is related and claims priority to U.S. Provisional Patent Application No. 61/950,729, entitled "PERSONAL GLOBAL ROAMING 3FID SYSTEM FOR SECURE TRANSACTIONS WORLDWIDE," by Sajit Bhaskaran, filed on Mar. 10, 2014, the contents of which are incorporated herein by reference in their entirety, for all purposes. The present application also is related and claims priority to as a continuation in part of U.S. patent application Ser. No. 13/076,261, entitled "INTEGRATED VOICE BIOMETRICS CLOUD SECURITY GATEWAY," by Sajit Bhaskaran, filed on Mar. 30, 2011, the contents of which are incorporated herein by reference in their entirety, for all purposes.

BACKGROUND

The in-band nature of voice over Internet direct end-to-end communication is often cited as a source of security weakness. For example a user becomes more vulnerable to hacking, masquerading and denial of service attacks that originate on the Internet. The out-of-band nature of standard telephony on the other hand ensures that use of standard phones and cell phones with a phone number does not suffer from these security weaknesses. However standard telephony is expensive, especially for international phone calls involving cell phones and roaming charges. For example, a person may travel to a foreign country, and attempt to use a credit card, only to find that her own credit card company has blocked the transaction for her own protection; and since she may not have call roaming when in the foreign country because of the high cost involved, the credit card company's attempts to reach her by phone to authenticate a transaction will fail. The end result is that a business transaction involving an authentication attempt by phone was not able to be fulfilled.

It is also worth pointing out the signaling delays that are prevalent in standard PSTN telephony, from the perspective of a computer process initiating a voice call. It can sometimes take 10 to 15 seconds for a call to appear as a ring tone, which alerts the person being called. In contrast, in-band voice over Internet calling typically has a less than 1 second delay between initiation of a call and the ring tone event.

Because of the above security, cost and speed of transaction issues, "single click" or "single touch" or "single command" business transactions which involve 3 factors of authentication simultaneously are not found.

In many authentication systems, security questions are posed to test knowledge of one's personal secrets. These questions may be displayed on a screen to be read, or they may be spoken using text converted to speech. In either case, such systems are subject to eavesdropping where a would-be attacker can break the system by first discovering the security questions being asked. Hence, while security questions are desirable, the possibility of eavesdropping or learning what these questions are presents problems for the security of an authentication system.

Another problem is repudiation in securing business transactions, including payment transactions. In this context, repudiation is the refusal of an individual to acknowledge that certain commitments (financial or otherwise) have been accrued upon a transaction. This problem is exacerbated in verbal transactions. Some complex biometric types of authentication can be repudiated because it is difficult for normal human beings to verify them without the aid of experts or a computer. The argument of forgery has been successfully used in some cases of repudiating a previously executed business transaction. For instance, the practice of hand-written signatures on documents like checks is susceptible to forgery. A would-be thief can learn how to copy the victim's signature quite easily.

Recently some electronic signing systems have appeared that depend on routing a document for signature to a correct email address of the intended signer. These have the further problem that email can be hijacked or diverted by a would be attacker; once the attacker receives the email with the document for signing, this person is allowed to sign the document. A much more secure method for signatures is needed. Also, the person who signed such a document could always at a later date claim that someone else intercepted the email and signed the document without his knowledge. A more secure method of signature, which cannot be repudiated is desirable.

SUMMARY

In U.S. patent application Ser. No. 13/076,261 titled "Integrated Voice Biometrics Cloud Security Gateway", incorporated herein by reference in its entirety, the acronym "IVCS" was used. In this document the acronym has been deemed inter-changeable with "VICS", with only the order of the words reversed to "Voice-Biometrics Integrated Cloud Security Service" Gateway.

A Three Factor Identification and Authentication System for Personal Roaming, abbreviated in this document to 3FID System, is described for performing highly secure, fast and cost-less or low cost roaming transactions, anywhere in the world, using a mobile device. In our system there is no need for the roaming user being tied to a specific device she may use (e.g. fixed smartphone with a fixed phone number). The user is free to borrow someone else's computer, or rent a pre-paid phone in another country—there is no dependence on a fixed phone-number association with a user.

A method for three (3) factor authentication in one (1) step which includes a silent question, or what we term an implied security question, is introduced.

A method for signing of transactions using one's voice is introduced, which solves the problem of attempted forgery in many cases, and also allows most transactions to enjoy a strong non-repudiation capability.

In some embodiments, a computer-implemented method to authenticate a user through a triple factor authentication in one step includes receiving, by a server, an access request sent to a network address of a resource server from a user using a user device. The access request includes a unique record identifier, placing a call to the user device, receiving from the user a response to a prompt for the user; receiving a voice sample of the user, and comparing the voice sample of the user with a selected voice biometrics record. Further, some embodiments include converting the voice sample into a speech-to-text phrase and comparing the speech-to-text phrase against a stored secret text phrase to verify that the speech-to-text phrase matches an answer to the silent security question.

A method for signing a transaction includes collecting a plurality of voice samples from a user during a transaction and converting each of the plurality of voice samples to a corresponding text file. In some embodiments, the method includes concatenating the plurality of voice samples into a single sound file, matching the single sound file with a text independent voice biometric record, and computing a signature of the transaction.

DETAILED DESCRIPTION

Figure 1:
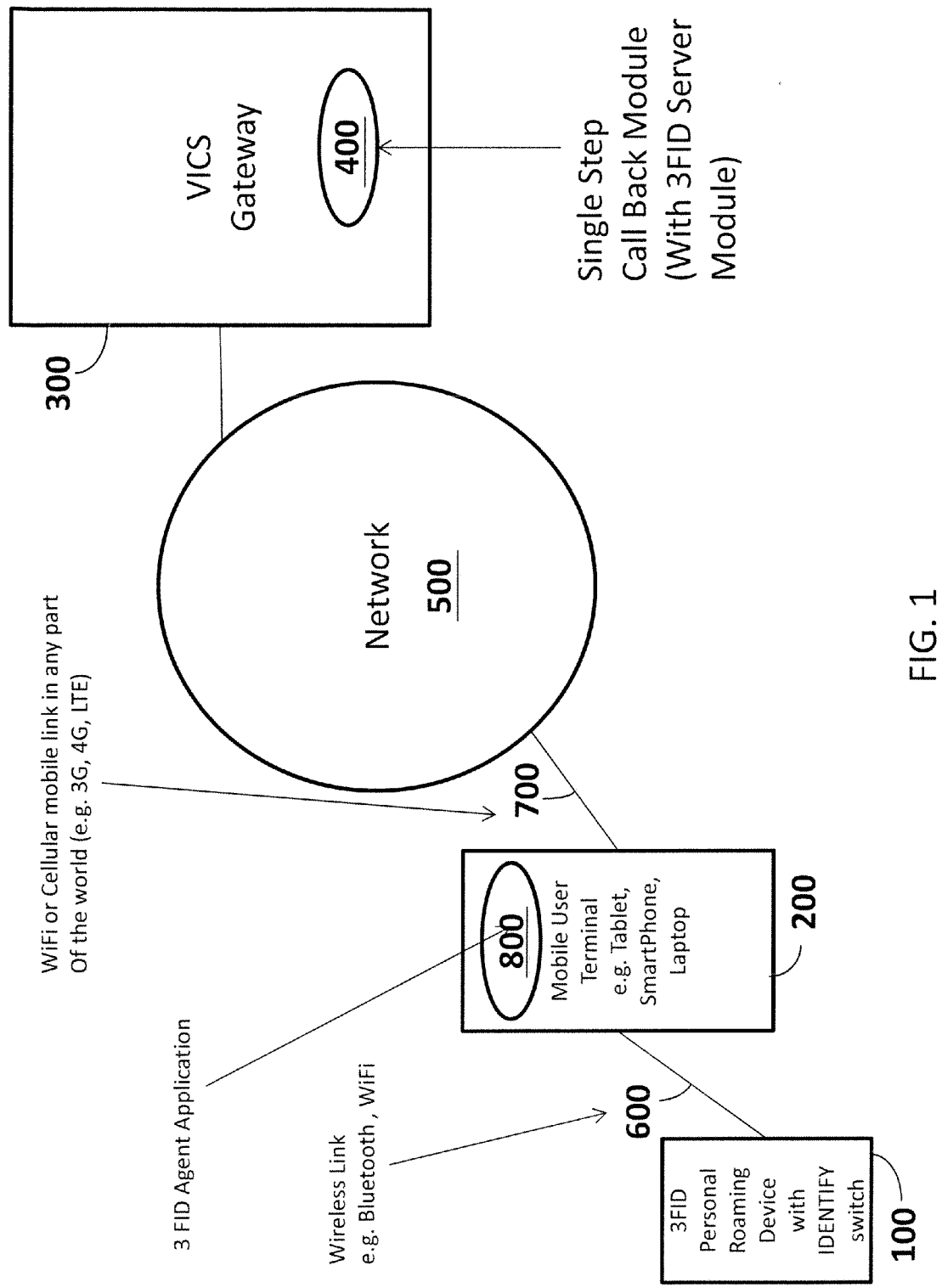
FIG. 1 is a diagram of a 3FID Personal Roaming System Architecture, according to some embodiments.

With the pervasive advance of the internet and mobile user terminals capable of linking with a network, it becomes more desirable for users to have unrestricted access to private network accounts from remote locations. While this is technologically feasible, the issue of security and identity verification becomes all the more relevant, as the technology for hacking and eavesdropping makes similar advances. The possession of a mobile user terminal such as a cellular phone, a smart phone or a tablet device is not sufficient proof of identity for a user attempting to access a private network account such as a financial service account, or a personal database account in a social networking server. Moreover, in many circumstances the authorized user of a private network account may use multiple mobile devices to access the private account. Further, some of the mobile devices used to access the private account may be provisory devices that are not registered with the private network server. In some situations the user may attempt to access a private network account from a desktop computer, a laptop computer, or even an unsecure computer device, when no other option is available. It is desirable that the user has access to the private network account even under these circumstances. Accordingly, embodiments disclosed herein provide a device that couples with the mobile user terminal when the mobile user terminal is used to access a private network account. The device is configured to exchange information with a network server that verifies user identity, enabling the user to access the private network account Embodiments as disclosed herein include a device having a memory circuit storing a unique identifier, a processor circuit, and a radio-frequency antenna configured to communicate with a mobile computer device. In some embodiments the device includes a switch coupled to the antenna, the switch configured to provide one of a first state (e.g., IDENTIFY state) and a second state (e.g., AUTHENTICATE state) to the mobile computer device. The processor circuit is configured to communicate with the mobile computer device via an application programming interface (API) installed in the mobile computer device, and provide commands causing the mobile computer device to transmit the unique identifier to a network server. Furthermore, in some embodiments the processor circuit is configured to receive a challenge message from the network server and provide to the mobile device a response to the challenge message to be transmitted to the network server. Moreover, the processor circuit is configured to register a user presence with the network server when the switch is in the first state, and to provide an authentication string to the network server when the switch is in the second state.

In some embodiments, a computer-implemented method to authenticate a user through a triple factor authentication in one step includes receiving, by a server, an access request sent to a network address of a resource server from a user using a user device, the access request comprising a unique record identifier. The method may also include placing a call to the user device, receiving from the user a voice response to a generic prompt associated with an implied security question for the user, comparing the voice response of the user with a selected voice biometrics record; converting the voice response into a speech-to-text phrase, and comparing the speech-to-text phrase against a stored secret text phrase to verify that the speech-to-text phrase matches an answer to the implied security question. In some embodiments, the implied security question is one of a plurality of security questions stored in a memory of the server.

In yet other embodiments, a method for signing a transaction includes collecting a plurality of voice samples comprising information elements from a user during a transaction, concatenating the plurality of voice samples into a single sound file; matching the single sound file with a text independent voice biometric record, and computing a signature of the transaction comprising the information elements, the single sound file, and a result of the matching of the single sound file with the text independent voice biometric record.

FIG. 1 is a diagram of a 3FID Personal Roaming System Architecture, according to some embodiments. Accordingly, the system architecture may include a VICS gateway 300 communicating with a mobile user terminal 200 via a network 500. Mobile user terminal 200 communicates with network 500 via a WiFi or cellular mobile link 700. In some embodiments, link 700 may include a 3G, a 4G, or an LTE network link. In some embodiments, the system architecture may include a 3FID personal roaming device 100 coupled to mobile user terminal 200 via a wireless link 600. VICS Gateway 300 may be a server including a processor and a memory. The processor may be configured to execute commands stored in the memory such that VICS Gateway 300 performs steps described in methods consistent with the present disclosure. Likewise, mobile user terminal 200 may include a processor and a memory. The memory in mobile user terminal 200 may store commands which, when executed by the processor in mobile user terminal 200, cause the mobile user terminal 200 to perform at least some steps as described in methods consistent with the present disclosure. In some embodiments, mobile user terminal 200 may in fact be a desktop computer device in a remote location, and link 700 may be an unsecure link to network 500. Even under unsecure network link configurations, 3FID device 100 may establish a secure identification and authentication link with VICS Gateway 300. Moreover, a network server hosting a private network account for the user if 3FID device 100 may transmit and receive information with the user through the secure channel established between VICS Gateway 300 and 3FID device 100, regardless of the specific capabilities of mobile user terminal 200 and network link 700.

In some embodiments, a system as disclosed herein includes a 3FID device that communicates with VICS Gateway 300. Complementing smartphones, tablet devices or laptop computers, which are expensive and susceptible to theft, Personal Roaming 3FID Device 100 may be a small, wearable or clip-on device which can be built to retail for less than $10. Its use for secure transactions by a user is tied to additional personal security and identification information stored on the VICS gateway. 3FID device 100 essentially strengthens the security of an in-band Voice over Internet communications path between VICS gateway 400 and mobile user device 200. Furthermore, by using a three-factor, single-step call back (3 factors, single step call back) module 400, VICS gateway 300 avoids the usual high roaming charges incurred by the user's cell phone service provider even when receiving a call. In some embodiments, 3 Factors in a Single Step call back authentication feature 400 includes communicating directly with a voice over Internet application on the Wi Fi interface of the mobile user device. Thus, in some embodiments the mobile user with a 3FID device incurs zero cost when doing a highly secure 3 Factor in 1 Step authentication as part of a secure business transaction. These transactions can also be payment transactions where money is moved. By strengthening the security of an in-band voice over Internet communications path end-to-end, the cost-less or low-cost nature of voice over Internet calling becomes useful and practical as one factor to be relied on in authenticating transactions.

Embodiments of a 3FID system as disclosed herein enable highly secure transactions to be performed in a fast and low-cost manner, throughout the world, using a mobile computing device that the user is able to access.

A method for securely authenticated voice over Internet calls, in combination with the 3FID Device and a function call application programming interface (API), is described. This allows any user with a mobile computing device to make and receive securely authenticated phone calls. The known and located prior art for secure session initiation protocol (SIP) is described in RFC 5359 2008 Internet Engineering Task Force "Session Initiation Protocol Service Examples".

A method of 3 factor authentication in 1 step, using the mechanism of a silent, or implied, security question, is described. The present disclosure does away with a non-empty challenge message; effectively a phone, uniquely associated with a user, merely rings and the user just answers the ring, and speaks the answer to an implied security question, that is, a silent security question. This has the effect of a significant improvement to the security of the overall access control system.

A method for digital voice signatures for securing the integrity and non-repudiation of these transactions, using the VICS Gateway features of voice biometrics and voice-conveyed exact text secrets, as disclosed in U.S. patent application Ser. No. 13/076,261 titled "Integrated Voice Biometrics Cloud Security Gateway", is a part of this disclosure. The concept of playback for human verification—either for audit purposes or in a court of law—are also described. Voice is an optimal vehicle for non-repudiation because a number of human witnesses without any special training can listen to a voice playback and confirm that the audio recording of a voice is indeed spoken by a known person. Voice can also convey information that can be computer verified against a database, unlike other forms of biometrics such as face-picture, finger-print or retina-scan. Embodiments as disclosed herein may include:

1. A system of 3 Factor in One Step Identification/Authentication for Personal Roaming "3FID System," the system including any one of the following features:
  a. A 3FID Device with an IDENTIFY/AUTHENTICATE switch, and a unique hardware serial number integrated circuit chip
  b. A Voice Integrated Cloud Security Gateway augmented with a 3FID Server process, which authenticates and maintains the presence of an identity
  c. A 3FID Agent application running on a mobile user terminal
  d. A method of single step callback in which 3 or 4 factors of authentication are verified with a single press of a button, or a single click, or a single touch
  e. An application programming interface for developers of $3^{rd}$ party applications to use and embed in their software, when the disclosure described here is made available as a cloud service, or other form residing on a server connected by a communications path.

2. A method for computing, recording and playback of digital voice signatures of transactions comprising:
  a. Collection multiple voice samples in the natural course of a transaction
  b. Converting the voice samples to exact text
  c. Concatenating the multiple sound files into a single sound file, which can be replayed for the human ear, the resulting concatenated file being the digital voice signature file
  d. A transaction record comprising all the voice samples, all the converted text data, and the computed digital voice signature file.
  e. The above 4 steps, combined with the concept of voice playback and computer file generation playback, allow business transactions to be made using this system with non-repudiation as a key property.

3. The ability to roam with VoIP internationally is made possible by the 3FID Device and the Wi Fi channel on the user mobile terminal, and any phone call transaction can be enabled, billed and authenticated by single factor (i.e. 3FID Device Only), dual factor (3FID Device plus voice biometric), or three factor (3FID Device plus voice biometric plus possession of secret information conveyed by voice).

Figure 2:
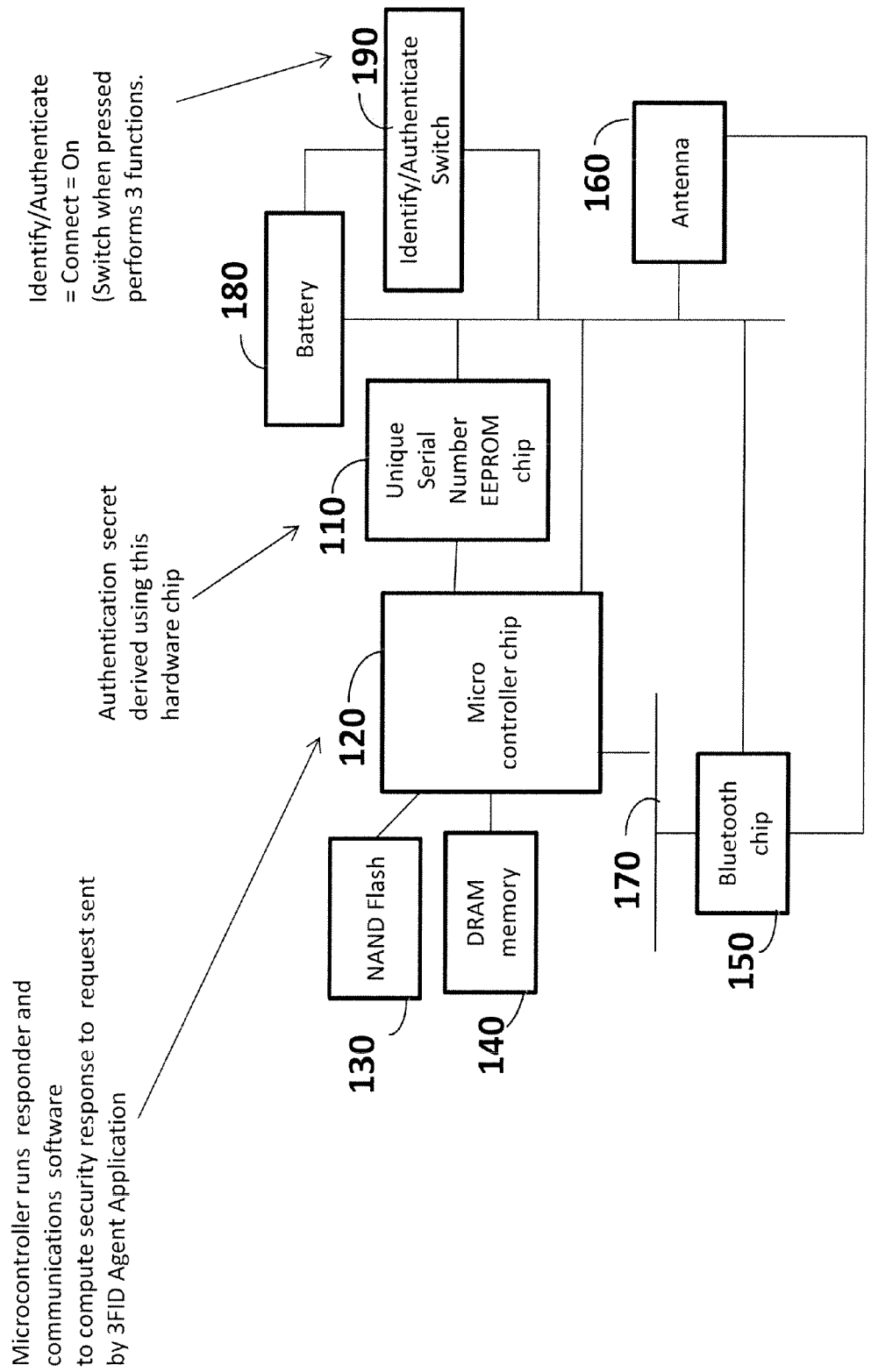
FIG. 2 illustrates an outline of schematic for printed circuit board: 3FID Personal Roaming Device, according to some embodiments.

4. The ability to do secure transactions involving 2 or more factors of authentication at zero cost and a single click/touch/voice-command Personal Roaming 3FID Device FIG. 2 illustrates an outline of a schematic for printed circuit board including 3FID Personal Roaming Device 100, according to some embodiments. In one embodiment this is a small form-factor, lightweight, low battery power device that is used as a wearable or clip-on element in a multi factor authentication system, such as the Integrated Voice Biometrics Cloud Security Gateway described in U.S. patent application Ser. No. 13/076,261 titled "Integrated Voice Biometrics Cloud Security Gateway", henceforth referred to as a VICS gateway in this document. The device 100 in FIG.

1—henceforth referred to as the 3FID Device is depicted in greater detail in FIG. 2. In one embodiment it can be a plastic case containing a printed circuit board (PCB). The PCB has a hardware "unique serial number" semiconductor chip 110 (cf. Maxim DS2401, data sheet for Silicon Serial Number integrated circuit chip) working in conjunction with a microcontroller 120 (e.g. Atmel 32 bit family). 3FID device 100 may include a plurality of memory circuits, such as a NAND flash memory 130 and a DRAM memory 140. A microcontroller 120, when powered, executes a continuously running computer program that communicates on a low power wireless channel such as Bluetooth—see channel 600 in FIG. 1—with a mobile user computing device 200. In that regard, microcontroller 120 may be configured to execute commands stored at least partially in any one of NAND flash 130 and DRAM memory 140. Accordingly, microcontroller 120 may cause 3FID device to perform at least partially any one of the steps in methods as disclosed herein, upon execution of commands stored in NAND flash 130 and DRAM memory 140. With reference to FIG. 2 the communications channel could be provided by a Bluetooth chip 150 connected to a tiny antenna 160.

The user initiates an IDENTIFY/AUTHENTICATE action before any secure transaction by consciously enabling the IDENTIFY switch 190. In some embodiments of the disclosure, power is always on, an example being devices where ambient light is sufficient to power the device. The IDENTIFY switch being pressed results in encrypted or non-encrypted packet communications signals being to the VICS Gateway to indicate that the user is present, not absent, and can be reached. The use of encryption is configurable by the user, but will be performed by default unless explicitly disabled.

The 3FID with IDENTIFY switch can also be used by the user to bypass a web authentication sequence in certain contexts, which is time consuming and involves many steps (launch browser, type, click or touch screen etc.). For instance, to authenticate with a phone service or other service provider, the user just needs to press the button, and it will initiate the 3 Factor in Single Step Callback authentication procedure—the user just has to use her voice to answer the call to complete the transaction.

In general by enabling a configuration option on the 3FID server, which can set a context for the entire authentication sequence from the beginning to the end of a transaction, then just by pushing the IDENTIFY button a user can complete the authentication sequence of 3 Factor Single Step Callback.

3FID Agent Application

Most mobile user terminal devices with a computer processing unit, such as smartphones, allow applications to execute under software control. We describe such an application here that is an essential element of the system. The 3FID Agent Application 800 in FIG. 1, when needed, transmits packets on its Wi-Fi or cellular channel 700 in order to communicate with the VICS Gateway, on behalf of the 3FID Device, as when the user wishes to perform a secure transaction or when the user wants to make her presence known to the VICS Gateway. However, for power conservation considerations on the mobile user terminal, it stays in non-transmit mode most of the time, and wakes up when (a) the 3FID Device is set to the IDENTIFY/AUTHENTICATE state by the user, using the hardware switch and (b) the configuration information, stored in a file on the mobile user device for the use of the 3FID Agent Application 900, allows that transmit of packets may begin. By using this combination of a hardware toggle switch and a software process in the design, it is possible to conserve significant amounts of power on the mobile device. Transmit of packets is known to consume significantly larger amounts of power when using Wi-Fi or advanced cellular communications technologies.

Figure 3:
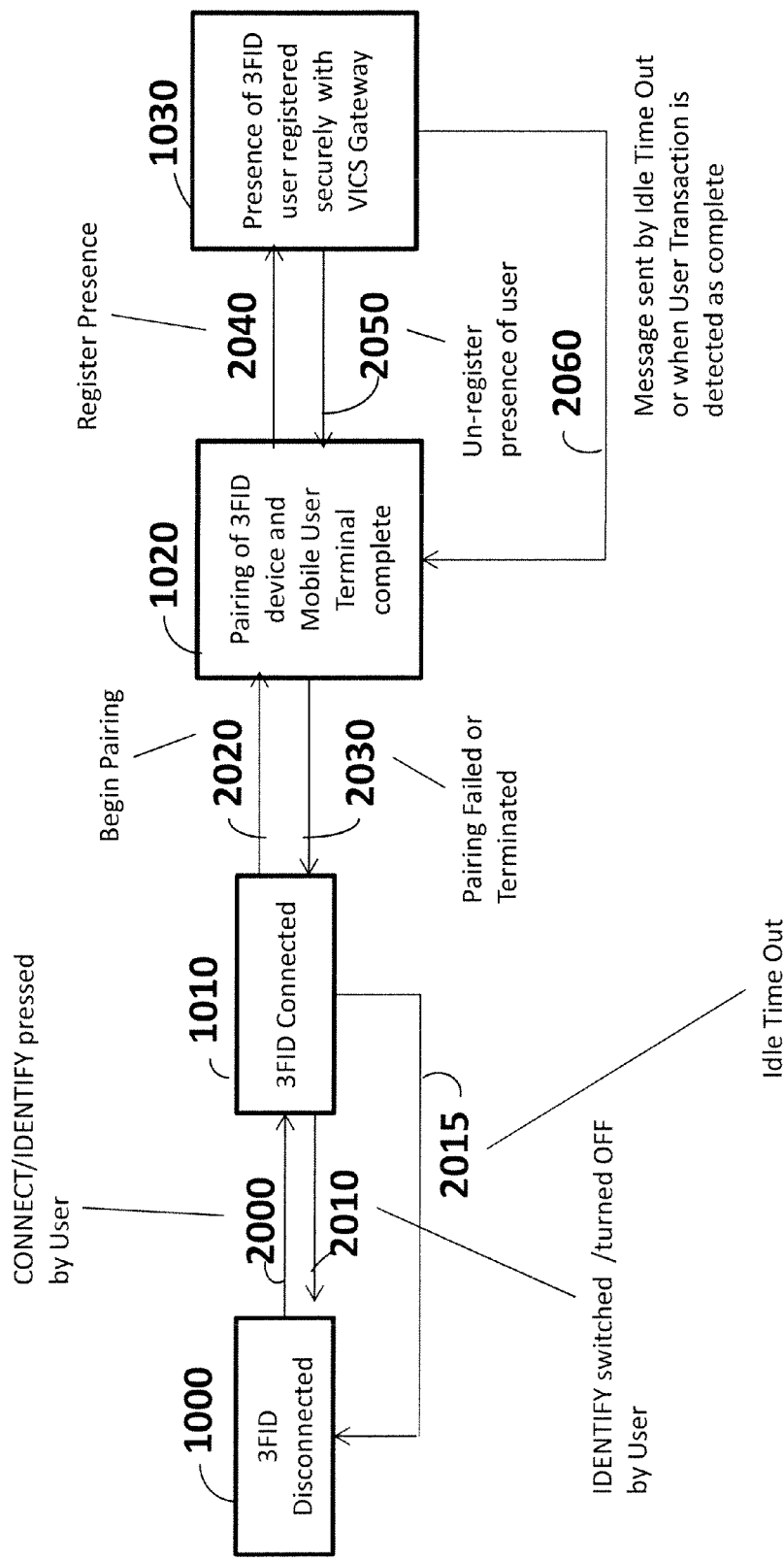
FIG. 3 shows the State Transition Diagram for indicating presence of a 3FID user and also for automatically shutting off power when the user has completed transaction or when the user abandons transaction and becomes idle, according to some embodiments.

When the 3FID device is set to the IDENTIFY state, it registers the user's presence with the VICS Gateway. See FIG. 3 for a complete state transition diagram.

Figure 4:
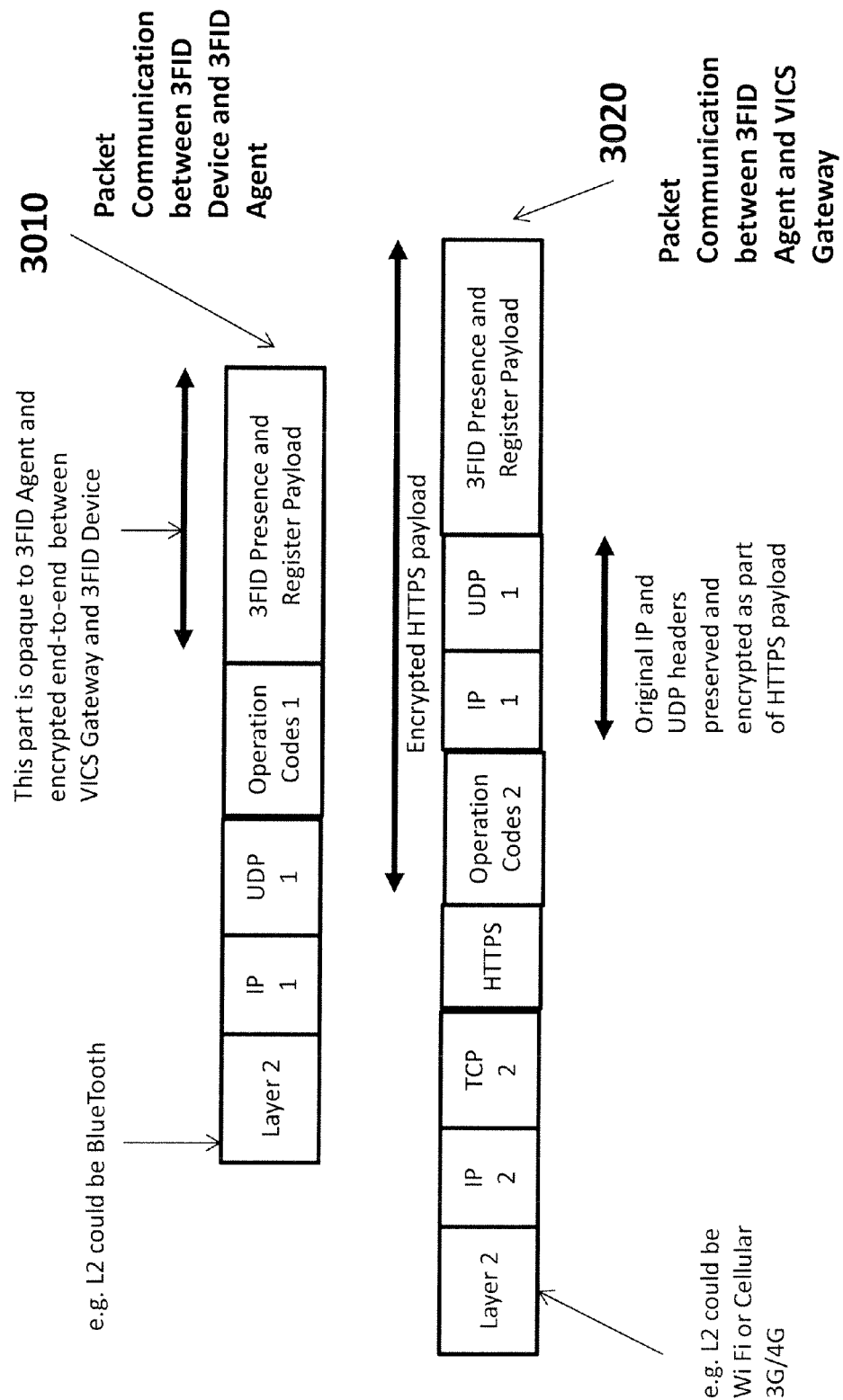
FIG. 4 is a detailed block diagram of the communication packet format used in a method for 3FID process, according to some embodiments.

In one embodiment of this disclosure, a 3FID device detect packet, constructed using UDP/IP, is encapsulated by the 3FID Agent Application inside a standard HTTPS/TCP/IP packet. Standard TLS/SSL/HTTPS (see Request for Comments: RFC 5246, August 2008, Internet Engineering Task Force Transport Layer Security (TLS) Protocol Version 1.2) methods of encrypting this payload—which includes an internal IP, UDP and payload—are used. The VICS Gateway decrypts the HTTPS packet received from the 3FID Agent, and internally it finds an unwrapped IP packet which originated at the 3FID device. The entire encapsulation and encrypted payload is shown in FIG. 4 as one possible embodiment.

By the above method, and without limitation to this embodiment, a 3FID Device presence is securely made known to the VICS Gateway.

VICS Gateway Single Step Call Back Enhanced with 3FID Server Module

This section describes the enhancement to the Single Step Callback with 3 Factor Authentication described in U.S. patent application Ser. No. 13/076,261 titled "Integrated Voice Biometrics Cloud Security Gateway", and implemented as a computer process on a VICS Gateway. We will refer to this enhancement as the VICS 3FID Server.

The following methods are implemented on the VICS 3FID Server.

Method of Generating Dynamic Secret Keys for use in 3FID to VICS Gateway Communication The method described here enables encryption and authentication between the 3FID Device and the 3FID Server with zero-configuration of keys and other complex information on the part of the end user. The 3FID Server or the 3FID Device can initiate a communication by sending a date, a time and a random string, or a proper subset of any of these, in the clear. After this step, each side computes an identical secret key using the decentralized algorithm described here.

In the case of the serial number chip, a globally unique and fixed (e.g. 64 bit or 128 bit in size, depends on the specific hardware chip, longer strings than 128 bits are also possible) number, or character string, is read from it into the microcontroller's computer program. It is then combined with a calendar date specifically picked in the natural course of the transaction, represented as a 32 bit number in hexadecimal characters. Example: the date 25 Feb. 1988 is represented as hex 25-02-19-88, a 32 bit number. If the chip produces a 128 bit unique number, the combination with the 32 bit date produces a new and globally unique 160 bit number, which will be used as a secret key as described later. The combination can be based on any number of methods of combining two bit strings that produce a combined bit string whose length in bits is the sum of the lengths of the component bit strings. It is also done with the ability for both ends of a communication to calculate the same number independently and using the same mathematical algorithm. For example, the algorithm could be a well-defined permutation which can be reversed to produce the original components.

Important examples of dates that occur naturally in the course of transactions, and can be used in conjunction with the hardware serial number are, without limitation, (a) personal roaming 3FID device initialization or first time registration date, or (b) user reset date. On each of these events a new secret can be generated. At register time, the hardware 64 bit code is stored and encrypted in a file on the VICS Gateway (300 in FIG. 2), and it is associated with a user identity (e.g. name and address of a person, or a telephone number). In addition the date of register is stored on both the personal roaming device 100 and the VICS gateway 400.

As a variant of the date, a date and a time, can also be used, for example the computer system time-stamp of an event during the transaction, which is typically also recorded as a natural part of performing the transaction.

As a variant, an optional random string of some length can be used in addition to the date, to strengthen the security of the secret key. On the 3FID device, the optional random string and date are stored in some permanent area of storage, as in the NAND Flash 130.

Administrator Initialization of 3FID Device

Figure 5:
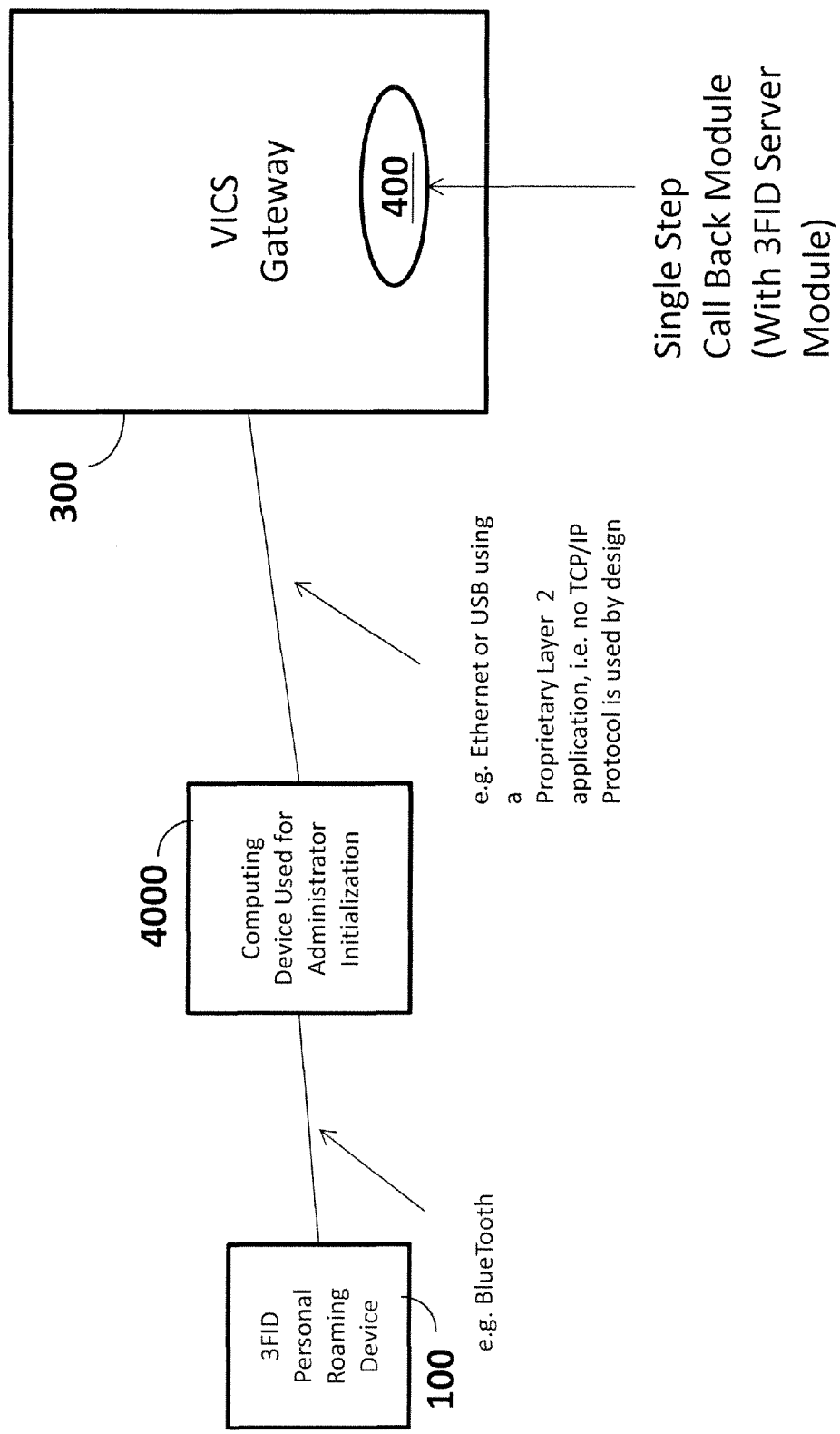
FIG. 5 shows the process for administrator secret key initialization in order to make key invisible to a non-admin user, according to some embodiments.

Multiple organizations may own and operate a 3FID roaming system. In each case, a set of devices is assigned to an organization and a process of administrator initialization is performed. This could be performed by the administrator using a tablet or laptop computer 4000 (see FIG. 5) having both a Bluetooth interface (for connecting to the new 3FID Device) and an Ethernet or USB interface (for connecting to the VICS Gateway at the same time). The initialization date and the unique serial number and the initial shared secret key are then stored on this computer 4000, which will then be placed off-line and disconnected from any public network, for the complete security that the values of the hardware serial numbers cannot be stolen by Internet methods.

The initial secret key, along with an administratively assigned 3FID Device Serial Number, is also written into a secure area of permanent storage on the VICS Gateway, along with the date of initialization.

| Admin Serial Number | Initial Secret Key | Date of Initialization |
| --- | --- | --- |

On the 3FID Device permanent storage e.g. its Flash memory, the Admin Serial Number and the Date of Initialization are stored:

| Admin Serial Number | Date of Initialization |
| --- | --- |

There is no storage of the secret on the permanent storage medium belonging to the 3FID Device. The number can be read by the embedded software from the serial number silicon chip, and then using the correct date the shared secret can be computed at any time by the 3FID Device software.

Enrolment of a 3FID User

The VICS Gateway of U.S. patent application Ser. No. 13/076,261 titled "Integrated Voice Biometrics Cloud Security Gateway", has a process for enrolling personal user identification/authentication information, such as:

a. Secret text information stored in a data base, and information that is relatively private to the user (e.g. date of birth, bank account number)

b. Voice biometric registration samples that are unique to the user c. Telephone numbers owned uniquely by this user, if any.

The above 3 practices of enrolment of private information are easy to implement by persons of ordinary skill in the art and are not described here. For example, an administrator may enable a web page for a specific user with an initial phone number, and the user can register an enrolment for secret text and voice biometrics records, for use in future authentication and identification.

It is assumed the above process is already performed, and such an enrolled user now needs to enroll the 3FID Device uniquely to be associated with user, from this date onwards. Such a process is shown in FIG. 6.

Figure 6:
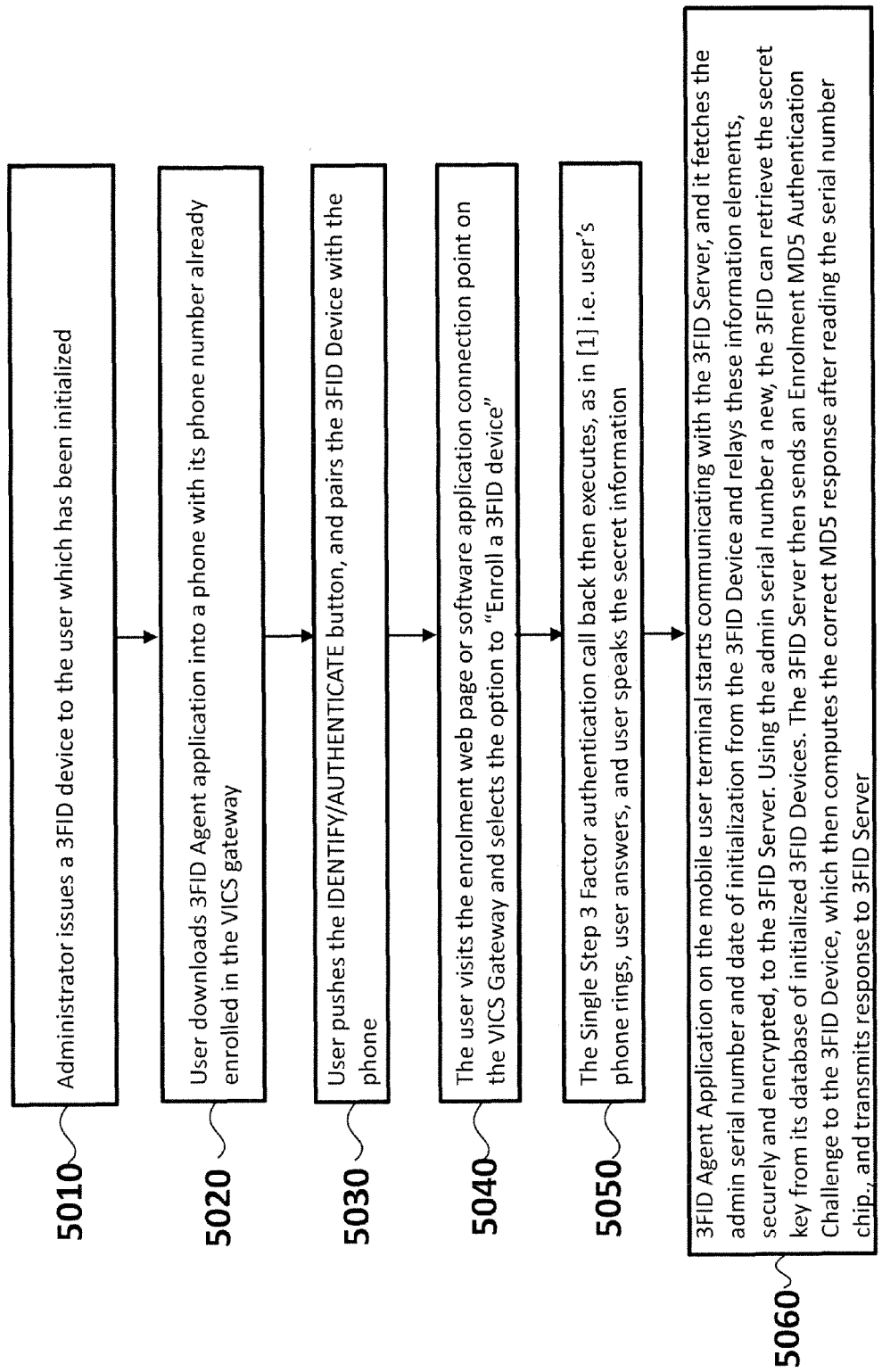
FIG. 6 shows a process for enrolling a 3FID device by a user, according to some embodiments.

FIG. 6 shows a process for administrator secret key initialization in order to make key invisible to a non-admin user, according to some embodiments. Steps in FIG. 6 may be performed at least partially by a processor executing commands stored in a memory, the processor and the memory included in a 3FID Device consistent with the present disclosure (e.g., 3 FID Device 100). In some embodiments, steps in FIG. 6 are performed at least partially by a processor and a memory included in a mobile user device as disclosed herein (e.g., mobile user device 200). Further, in some embodiments steps in FIG. 6 are performed at least partially by a processor and a memory included in a VICS Gateway server as disclosed herein (e.g., VICS Gateway 100). Embodiments consistent with the present disclosure may include a method having at least one, but not all, of the steps illustrated in FIG. 6. Furthermore, in some embodiments consistent with the present disclosure a method may include steps as illustrated in FIG. 6 but performed in a different order, or even overlapping in time.

1. Administrator issues a 3FID device to the user which has been initialized as per procedure 5.3.2 above, as in 5010.

2. 5020 User downloads 3FID Agent application into a phone with its phone number already enrolled in the VICS gateway, as described earlier above.

3. User pushes the IDENTIFY/AUTHENTICATE button, and pairs the 3FID Device with the phone, e.g. as in Bluetooth pairing, see 5030

4. The user visits the enrolment web page or software application connection point on the VICS Gateway and selects the option to "Enroll a 3FID device" see 5040 (this is an example embodiment).

5. The Single Step 3 Factor authentication call back then executes, as in U.S. patent application Ser. No. 13/076,261 titled "Integrated Voice Biometrics Cloud Security Gateway", i.e. user's phone rings, user answers, and user speaks the secret information, to successfully authenticate to the VICS Gateway. See 5050.

6. At this point, the 3FID Agent Application on the mobile user terminal starts communicating with the 3FID Server, and it fetches the admin serial number and date of initialization from the 3FID Device and relays these information elements, securely and encrypted, to the 3FID Server. Using the admin serial number a new, the 3FID can retrieve the secret key from its database of initialized 3FID Devices. The 3FID Server then sends an Enrolment MD5 Authentication Challenge to the 3FID Device, which then computes the correct MD5 response after reading the serial number chip. See 5060. [MD5 mechanisms are known to persons of ordinary skill in the art.] Once the VICS Gateway 3FID Server receives the correct MD5 response, it can inform the user that Enrolment was successful.

Detect and Record Presence of a 3FID User at VICS Gateway

The process of securely and privately detecting presence when the user roams from place to place is explained in FIG.

4. In this process, when the IDENTIFY/AUTHENTICATE button on the device is pressed, a communications takes place via the 3FID Agent and the 3FID Server sees the Admin Serial Number of the device, along with the internal IP and UDP address information IP 1 and UDP 1 (see FIG. 4). An MD5 challenge is done to authenticate the device before its presence is successfully detected and recorded at 3FID server. If this challenge fails to get the correct response from the 3FID Device, recording of presence will fail. The start time of this presence is recorded by the 3FID Server along with the user's non-secret identifier e.g. her name or email address.

Either due to a perceived security breach, or a configured idle time-out, the VICS 3FID server may decide to disconnect or un-register a 3FID device. The idle timer is a useful mechanism also for conserving power on the user mobile terminal and the 3FID device; when the timeout event occurs at the VICS Gateway 3FID server, a communications sequence takes place which ends with the power on the 3FID device turning off.

The Use of 3FID for Secure SIP/SDP Calling with a Dynamic Authentication String and an Application Programming Interface Function The VICS Gateway will implement a SIP/SDP and RTP direct i.e. end-to-end IP based voice call to the user mobile terminal, as part of its Single Step Call Back. The user mobile terminal can optionally be required to get a dynamically computed authentication string to establish SIP/SDP communications—the usual packet sequence being 1. SIP REGISTER
2. SIP ACK
3. SIP INVITE
4. SIP ACK
5. SIP RING
6. SIP CALL ESTABLISHED.

The method involves the 3FID server first computing a random string, and sending it encrypted to the 3FID device, right after presence was successfully registered.

We say the key or authentication string is dynamic because a new one is computed with each new presence event. It is computed automatically without user or administrator manual intervention.

The 3FID server and device can use the random string in combination with the shared secret key on the 3FID Device, to compute a new secret key or string. This string can be delivered to the 3FID Agent (or any application running on the user mobile terminal) by a standard API function call and response: E.g. get_secure_auth_string( ) as in a C program routine. The user mobile terminal—when sending the SIP REGISTER packet to the VICS Gateway, can then use this new key or authentication string as part of the secure SIP authentication standardized process, which does include the MD5 standard.

This process if followed greatly increases the security of the system and prevents denial of service attacks in the form of a flood of phone calls being triggered by malicious Internet traffic targeting the VICS Gateway. Because no transition to SIP INVITE, . . . , SIP CALL ESTABLISHED can take place until a SIP REGISTER is successful, this 3FID hardware assisted method prevents the user's phone from even ringing in the case of a malicious Internet originated attack. And since it involves a push of a button, such highly secure phone calling is extremely easy to use, unlike software implemented methods, which tend to be complex.

The 3FID Agent, when it receives any SIP REGISTER or SIP INVITE packet, can send an ACK with a SIP Authentication Required Parameter; the subsequent communication may make use of the correct authentication string computed at presence detection time. In this way and using the methods we outlined above, the 3FID Server will be allowed to make calls in to the 3FID Device.

The same process for secure calling using the 3FID Device can be used with any other caller; this disclosure for secure voice calling purposes is not restricted to the 3FID Server alone as a potential caller.

Computing and Verifying a Digital Voice Signature of Transactions

At enroll time for voice biometrics, each user enrolls a text independent voice record/model X, AND one or more text dependent pass-phrases p(1), p(2) . . . , which are secret. The latter are used for 3 factor authentication as described in U.S. patent application Ser. No. 13/076,261 titled "Integrated Voice Biometrics Cloud Security Gateway". The text independent voice record/model X is used below in verifying a digital voice signature.

Figure 7:
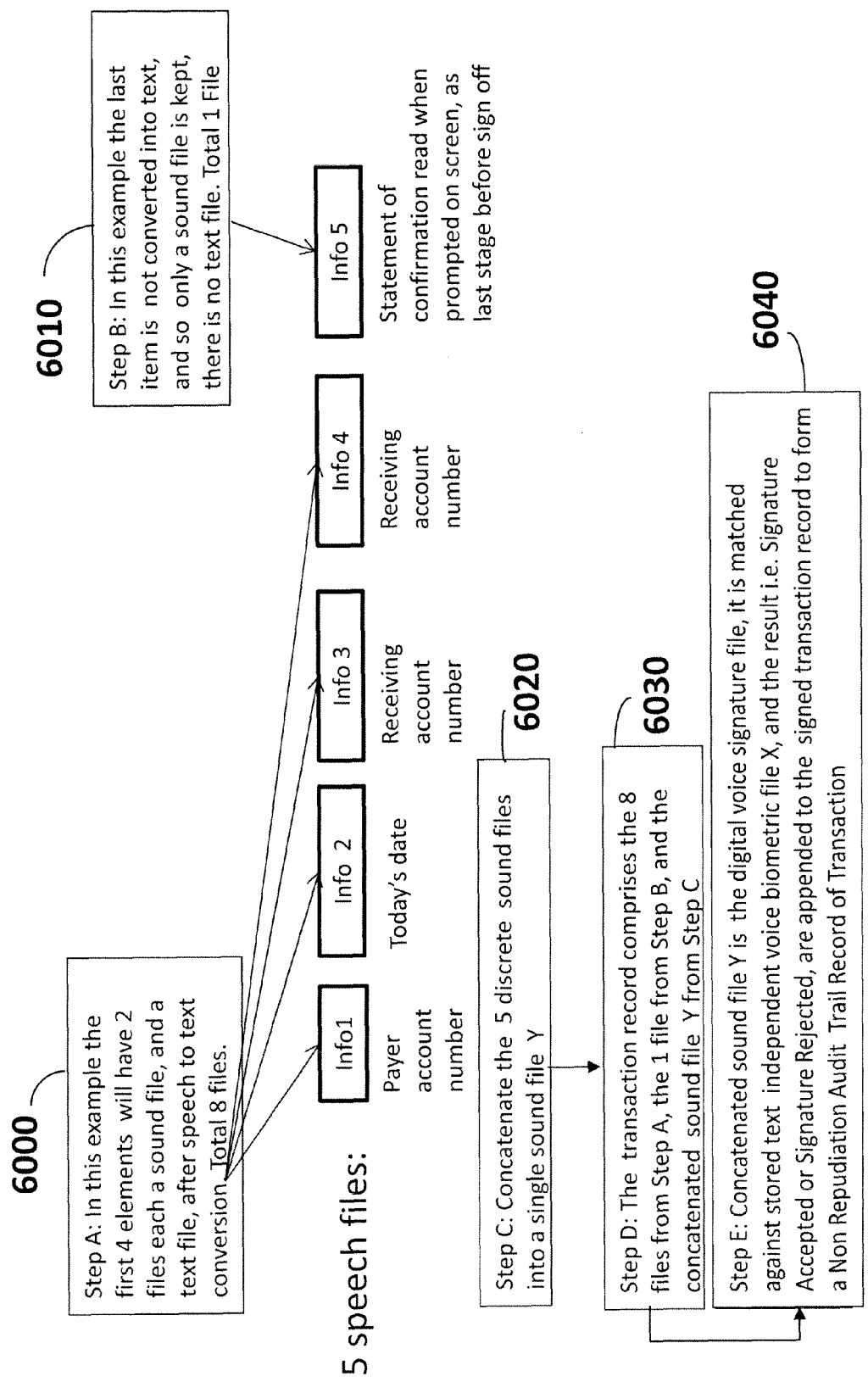
FIG. 7 is a method for digital voice signatures in a VICS gateway transaction record computation, and non-repudiation audit record, according to some embodiments.

FIG. 7 is a method for digital voice signatures in a VICS Gateway transaction record computation, and non-repudiation audit record, according to some embodiments. In some embodiments, a digital voice signature, the steps in FIG. 7 are performed totally by a processor executing commands stored in memory, the processor and memory included in the VICS Gateway 100 that has been disclosed herein. Steps in FIG. 7 may be performed at least partially by a processor executing commands stored in a memory, the processor and the memory included in a 3FID Device consistent with the present disclosure (e.g., 3 FID Device 100). In some embodiments, steps in FIG. 7 are performed at least partially by a processor and a memory included in a mobile user device as disclosed herein (e.g., mobile user device 200). Further, in some embodiments steps in FIG. 7 are performed at least partially by a processor and a memory included in a VICS Gateway server as disclosed herein (e.g., VICS Gateway 100). Embodiments consistent with the present disclosure may include a method having at least one, but not all, of the steps illustrated in FIG. 7. Furthermore, in some embodiments consistent with the present disclosure a method may include steps as illustrated in FIG. 7 but performed in a different order, or even overlapping in time.

In FIG. 7, steps 6000, 6010, 6020, 6030 and 6040 describe 3 processes:

a. Computation of a digital voice signature
b. Verification of a digital voice signature
c. Computation of a Non Repudiation Audit Record of Transaction.

The concept of an information element, or more generally multiple information elements, associated with any transaction is introduced here. Every transaction in human interactions always has some associated information content that describe the transaction. For example in making a payment by check, the information elements include the payee, the payment amount, the payer bank and account number, etc. In another example, in a written letter, each sentence in the letter is an associated information element.

At the time of any transaction a digital voice signature verification can be performed, as depicted below, by (a) collecting associated voice samples or files, for each information element Info 1, Info 2, . . . , Info N, these voice samples occurring naturally in the course of a transaction that requires voice confirmation, and possibly at different times during the transaction (b) converting any specific subset of information Info p, . . . , Info q that is required by policy from speech to text and storing both the original sound files and converted text data text(p), . . . , text(q) as part of the transaction record (c), and concatenating the N files into a single sound file Y, then (d) doing an authentication verification of the computed file Y against text independent voice record X for the user—the last step producing a "signature accepted" or "signature rejected result. A "signature accepted" result and the associated voice clips, the concatenated sound file from the associated voice clips, and any converted speech-to-text resultant text files of a subset of these associated voice files, becomes what we define as a digital voice signature. The transaction then has a record—computed as shown in FIGS. 6—6030, and is allowed to proceed if the digital voice signature in 6020 as we have defined it, is correctly verified with a "signature accepted" result. Also, as shown in Step 6040 of FIG. 6, a Non Repudiation Audit Trail Record associated with this specific transaction is created and stored in a database for possible future reference.

Some explanation of the concept of concatenating sound files to produce a larger sound file is provided here. In the current state of the art when using text independent voice biometrics algorithms, if the speech clip is insufficiently long, it often results in an inaccurate identification or authentication result. To make such a system practical as we disclose here, we would need a very high degree of accuracy. For example, if one was engaged in a payment transaction, and supposing the payment amount was an utterance "Five thousand dollars". A single voice clip containing this utterance may fail to produce accurate results in many commercially available text-independent voice biometric verification engines. Fortunately, in observing most human transactions, there is enough information in terms of discrete phrases, words, numbers, numbers input as utterances in digit-by-digit form, answers to questions and the like, which when combined or concatenated as files using the method described here, do produce voice files of suitable length. While the technology slowly improves year by year, and one cannot bind any assumptions to hard timing numbers, we generally try to create sound files that contain more than 15 seconds of real speech by one person. In some embodiments, a predetermined length or duration of a sound file may be set to exceed a length that is sufficient to reach a desired value of a confidence level in the user authentication process. For example, in some embodiments it is desirable that the confidence level in the user authentication process be greater than 95%. In yet other embodiments, it is desirable that the confidence level in the user authentication process be greater than 99%, or 99.9%, or even 99.99%. The time length or duration of the sound file may be adjusted accordingly, depending on the power and capabilities of the voice biometric verification engine used in the user authentication process, and the quality of the sound file itself.

Three Factor Authentication or Identification of a User

Figure 8:
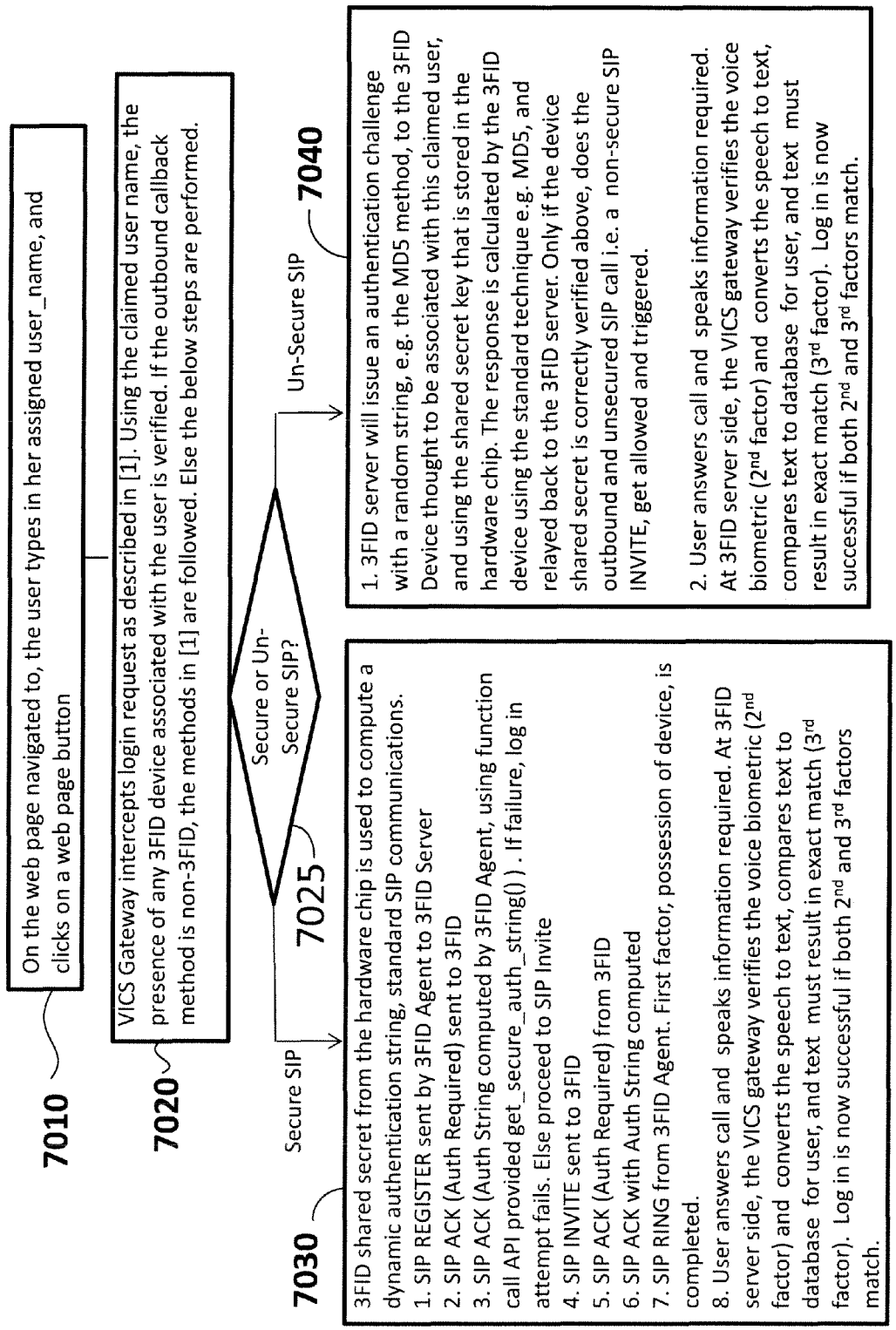
FIG. 8 depicts the 3FID end user single click/touch procedure, according to some embodiments.

FIG. 8 depicts the 3 FID end user single click/touch procedure, according to some embodiments. Steps in FIG. 8 may be performed at least partially by a processor executing commands stored in a memory, the processor and the memory included in a 3FID Device consistent with the present disclosure (e.g., 3 FID Device 100). In some embodiments, steps in FIG. 8 are performed at least partially by a processor and a memory included in a mobile user device as disclosed herein (e.g., mobile user device 200). Further, in some embodiments steps in FIG. 8 are performed at least partially by a processor and a memory included in a VICS Gateway server as disclosed herein (e.g., VICS Gateway 100). Embodiments consistent with the present disclosure may include a method having at least one, but not all, of the steps illustrated in FIG. 8. Furthermore, in some embodiments consistent with the present disclosure a method may include steps as illustrated in FIG. 8 but performed in a different order, or even overlapping in time.

We can now describe the enhanced 3 Factor in Single Step authentication for in-band VoIP calls. The below is one embodiment. Please refer to FIG. 8 and steps 7010, 7020, 7025, 7030 and 7040.

First we describe a Three Factor Authentication and there is no standard phone number involved.

1. User attempts a login
2. VICS Gateway intercepts login request as described
3. Using the claimed user name, the presence of any 3FID device associated with the user is verified. This process of detecting device presence has already been described above.
4. If the callback method configured for the user is Secure SIP, then the 3FID shared secret from the hardware chip is used to compute a dynamic authentication string, as described above for SIP communications. A user with a valid 3FID Key can be called, and if no successful SIP Register completed, then this login attempt terminates unsuccessfully. On the other hand, a successful SIP register allows the normal 3 factors in one step to proceed: (1) outbound call (2) voice biometric match (3) text secret in data base match with voice conveyed information.
5. If the call back method configured for the user is unsecured SIP, which will be quite common, then no authentication will be used in the SIP part of the call. However, before placing the call, the 3FID server will issue an authentication challenge with a random string, e.g. the MD5 method, to the 3FID Device thought to be associated with this claimed user, and using the shared secret key that is stored in the hardware chip. The response is calculated by the 3FID device using the standard technique e.g. MD5, and relayed back to the 3FID server. This response should be correct, else the authentication attempt is blocked and declared a failure. When the device shared secret is correctly verified above, the outbound and unsecured SIP call i.e. a SIP INVITE, is allowed and triggered.
6. At this point one out of 3 factors i.e. the "possession of a device" factor is verified. The call then proceeds and the voice input is taken and then in parallel the two more steps/factors (1) voice biometric match and (2) speech to text conversion and exact text match with text in data base, as described in U.S. patent application Ser. No. 13/076,261 titled "Integrated Voice Biometrics Cloud Security Gateway", are continued. Based on the authentication policy configured and the results of all 3 steps—the attempted authentication either passes or fails.

Four Factor Authentication or Identification of a User

Here we describe a Four Factor Authentication and there is a standard phone number and standard telephony procedures involved. A phone number is pre-enrolled and associated with the claimed user in the VICS authentication database.

1. User attempts a login
2. VICS Gateway intercepts login request as described
3. Using the claimed user name, the presence of any 3FID device associated with the user is verified. This process of detecting device presence has already been described above.
4. The 3FID server will issue an authentication challenge with a random string, e.g. the MD5 method, to the 3FID device thought to be associated with this claimed user, and using the shared secret key that is stored in the hardware chip. Accordingly, in some embodiments the challenge message comprises an encrypted string that is de-codified by a secret key stored in the hardware chip in the roaming device. This is communicated using the methods i.e. UDP and HTTPS, described in FIGS. 1 and 4. The response is calculated by the 3FID device using the standard technique e.g. MD5, and relayed back to the 3FID server. This response should be correct, else the authentication attempt is blocked and declared a failure. When the device shared secret is correctly verified above, the outbound call get allowed and triggered. The user may be in possession of the phone number in order to answer the call and proceed further with authentication.

5. At this point 2 out of 4 factors i.e. the "possession of a device" factor is verified—in this case the 2 devices are the 3FID device and the mobile user terminal. The call then proceeds and the voice input is taken and then in parallel the two more steps/factors (1) voice biometric match and (2) speech to text conversion and exact text match with text in data base, as described in U.S. patent application Ser. No. 13/076,261 titled "Integrated Voice Biometrics Cloud Security Gateway", are continued. Based on the authentication policy configured and the results of all 3 steps—the attempted authentication either passes or fails.

Concept of Replay of Digital Voice Signatures for Human Verification

All the sound files for each information element are archived and can be played back for human verification by ear witnesses.

The computer based and text independent voice verification procedure used in forming the digital voice signature can also be repeated at any time in the future, as part of audit trail verification with the same result every time. This is because a computer processing algorithm, which does not change, is used on the same set of files that were defined above in computing the digital voice signature, obtaining the same result every time, at authenticate time and at audit or court testimony time.

Voice is a convenient vehicle for non-repudiation, because a number of human witnesses without any special training can listen to a voice playback and confirm that the audio recording of a voice is indeed spoken by a known person. Voice can also convey information that can be computer verified against a data base, unlike other forms of biometrics such as face-picture, finger-print or retina-scan.

Figure 9:
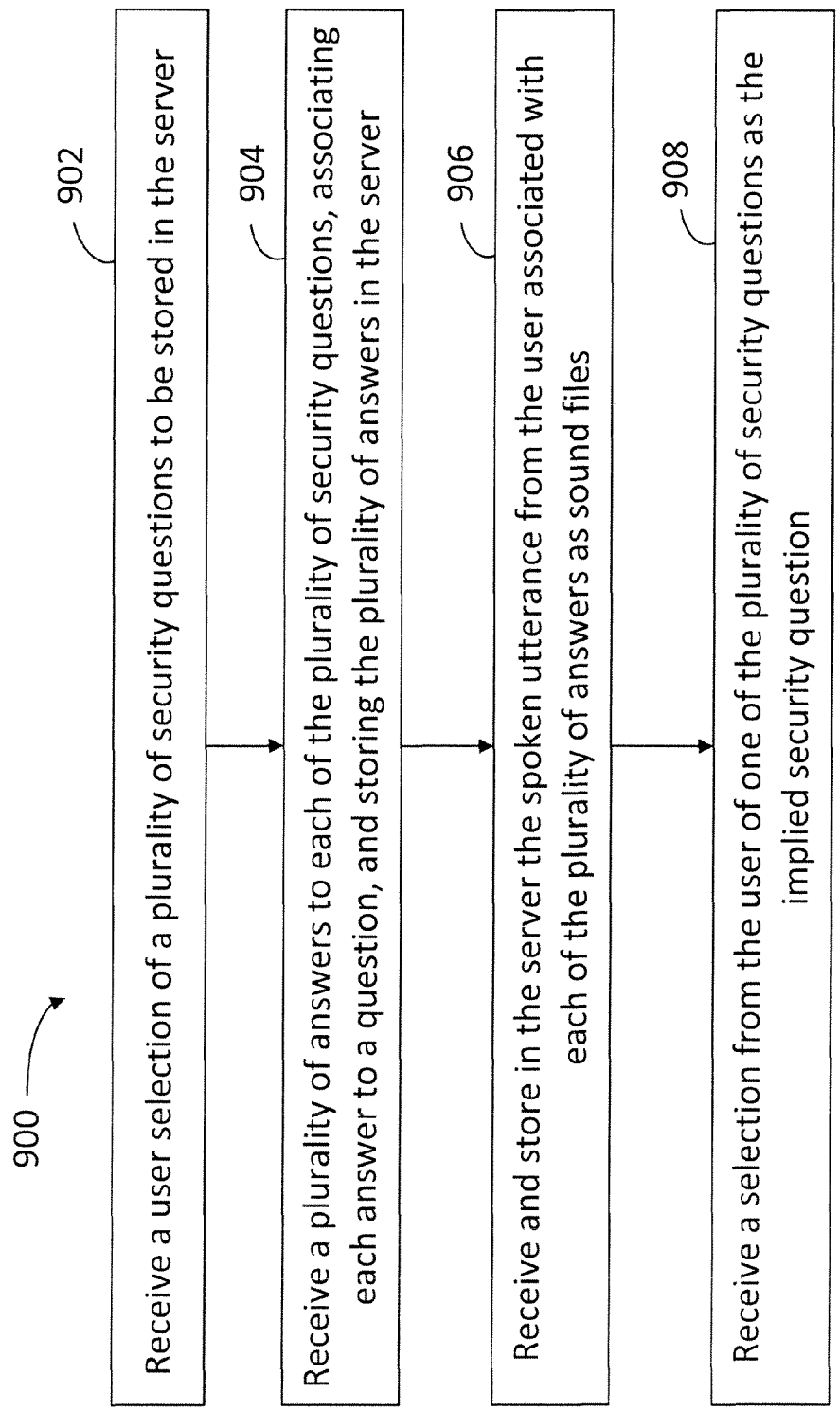
FIG. 9 is a method for enrolling a user with an IVCS server as disclosed herein including an implied security question.

FIG. 9 is a method 900 for enrolling a user with an IVCS server as disclosed herein including an implied (or 'silent') security question. Method 900 may be performed by the IVCS server when the user enrolls in the service. Step 902 includes receiving a user selection of a plurality of security questions to be stored in the server. Accordingly step 902 includes receiving from the user a list of N possible security questions, N being at least equal to 1. Step 904 includes receiving a plurality of answers to each of the plurality of security questions, associating each answer in the plurality of answers to a question, and storing the plurality of answers in the server. In some embodiments, the user enrolls the answer to each security question in textual data form, and the IVCS Gateway stored these in its user personal secrets database. For example, one possible answer could be the person's date of birth stored in 8 digit standard numerical format. Step 906 includes receiving and storing in the server the spoken utterance from the user associated with each of the plurality of answers as sound files, for each answer. Accordingly, step 906 includes computing and storing this enrolled voice sample as an internal voice biometrics record, using any well-known text-dependent voice biometrics algorithm. If N security questions and answers were enrolled in the text data base, then N voice biometrics records that correspond to the answers may also be enrolled. The IVCS system, through standard data base association procedures, will be able to retrieve both the text and voice biometrics records corresponding to any 1 of N possible security questions/answers. In some embodiments, when verification is performed from a voice utterance, the speech clip or sound file is both matched for biometric match, and also converted into text and the text compared against enrolled text in a user data base to produce an exact match. Step 908 includes receiving a selection from the user of one of the plurality of security questions as the implied security question. For example, if there are N security questions, the user may nominate one of them as the Implicit Security Question. Alternately, the IVCS system may select one question at random, or by some other method, out of N possible candidates, as the Implicit Security Question, and merely inform the user which one is designated as Implicit Security Question, so as to be prepared to answer correctly that particular question at verification time. The end result of step 908 is that the IVCS system has an internal database record indicating which question out of N questions is the Implied Security Question.

Figure 10:
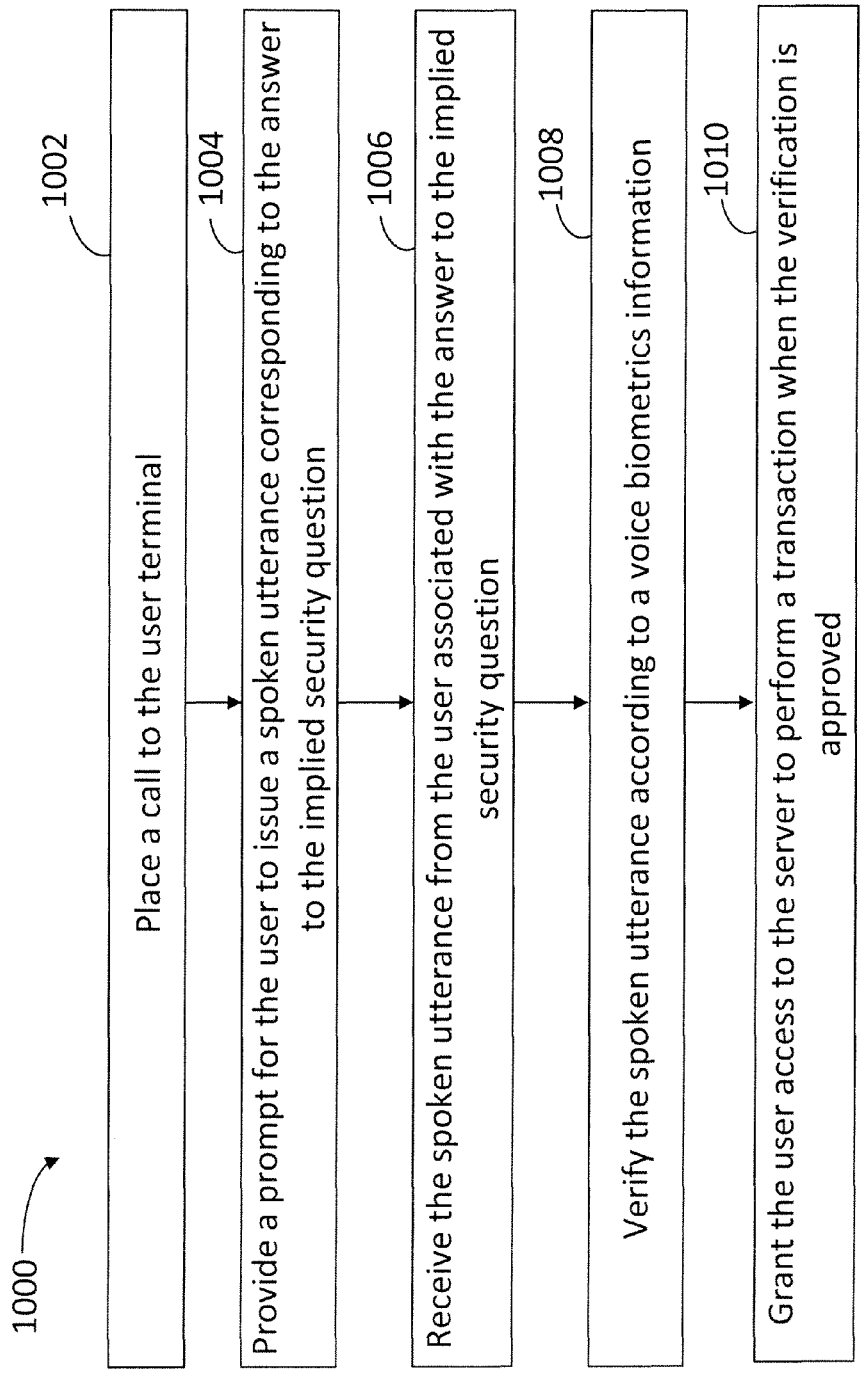
FIG. 10 is a method for verifying a user identity in a transaction with an IVCS server as disclosed herein, including an implied security question.

FIG. 10 is a method 1000 for verifying a user identity in a transaction with an IVCS server as disclosed herein, including an implied security question. Method 1000 is performed at verification time, when the user attempts to access the IVCS server to perform a transaction. Step 1002 includes placing a call to the user terminal. Step 1004 includes providing a prompt for the user to issue a spoken utterance corresponding to the answer to the implied question. For example, in callback mode the VBVS sends a challenge message to user terminal and prompts user to respond to challenge by voice into user device microphone. This prompt on the user device can be a stored voice playback, or a simple text prompt that alerts the human user at the device. In some embodiments, the prompt in step 1004 is simply an implied prompt including a single beep or a generic message such as "the system is ready to receive your answer." In some embodiments, the callback mode includes NO challenge message to the user terminal, only a phone ring with optional beep, prompts user to respond, to the implied security question, by voice into user device microphone. Step 1006 includes receiving the spoken utterance from the user associated with the answer to the implied security question. Step 1008 includes verifying the spoken utterance according to a voice biometrics information. In some embodiments, step 1008 includes the IVCS gateway performing a 3FID process as disclosed herein. Accordingly, step 1008 may include checking and verifying the user voice sample from the spoken utterance against stored voice biometrics information, and converting the user response using speech-to-text and compare resulting text phrase with stored secret text phrase. In some embodiments, the received user voice sample is checked and verified against the unique stored voice biometrics record that corresponds to the Implied Security Question. Accordingly, in such embodiments the IVCS gateway converts the user response using speech-to-text and compares the resulting text phrase with the stored secret text phrase that corresponds to the answer to the Implied Security Question. Step 1010 includes granting the user access to the IVCS server to perform the transaction when the verification is approved.

To the extent that the term "include," "have," or the like is used in the description or the disclosure, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." Pronouns in the masculine (e.g., his) include the feminine and neuter gender (e.g., her and its) and vice versa. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be disclosed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially disclosed as such, one or more features from a disclosed combination can in some cases be excised from the combination, and the disclosed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the disclosure. For example, the actions recited in the disclosure can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the disclosure.

The invention claimed is:

1. A computer-implemented method performed in a server comprising:

receiving, by a server, an access request sent to a network address of a resource server from a user using a user device, the access request comprising a unique record identifier, wherein the unique record identifier is transmitted to the user device by a roaming device, is recognizable by the server, the unique record identifier being encrypted between the server and the roaming device to be opaque to the user device;

establishing a secure communication between the user device and the server when the unique record identifier is recognized by the server;

placing a call to the user device using the secure communication;

receiving from the user a voice response to a generic prompt associated with an implied security question for the user, wherein the implied security question is one of a plurality of security questions stored in a memory of the server;

verifying that the voice response of the user matches a selected voice biometrics record;

converting the voice response into a speech-to-text phrase; and comparing the speech-to-text phrase against a stored secret text phrase to verify that the speech-to-text phrase matches an answer to the implied security question.

2. The computer-implemented method of claim 1, wherein the memory of the server stores at least one sound file and one text file with an answer to each of the plurality of security questions.

3. The computer-implemented method of claim 1, further comprising granting an access to the server to perform a transaction when at least one of the selected voice biometrics record or the stored secret text phrase match the voice response received from the user.

4. The computer-implemented method of claim 1, further comprising providing a challenge message to the user through the secure communication with the user device and to determine at least one of an identity of the user or an authentication of a user transaction based on a response to the challenge message received from the user through the secure communication with the user device.

5. The computer-implemented method of claim 4, wherein establishing a secure communication protocol with the user device comprises de-codifying an encrypted string that includes the unique record identifier.

6. The computer-implemented method of claim 5, wherein establishing a secure communication protocol with the user device comprises dynamically computing an authentication string for the user device.

7. The computer-implemented method of claim 1, further comprising detecting whether a switch in the roaming device is set into an identification state or into an authentication state, and issuing an authentication challenge for the user when the switch in the roaming device is in the authentication state, the authentication challenge comprising the unique record identifier.

8. The computer-implemented method of claim 1, further comprising disabling the secure communication when detecting, by the server, one of a security breach or a pre-determined time-out without activity from the roaming device.

9. The computer-implemented method of claim 1, wherein comparing the voice response of the user with a selected voice biometrics record comprises comparing the voice response of the user with a selected voice biometrics record having a length greater than a predetermined time period.

10. The computer-implemented method of claim 1, further comprising validating the voice response of the user when a confidence level of a comparison with the selected voice biometrics record is greater than 99%.

11. The computer-implemented method of claim 1, further comprising storing a sound file with a user utterance and a text file from the user utterance as a non-repudiation document for a transaction.

12. A system comprising:

a network interface circuit configured to couple with a user device through a network;

a memory configured to store data and a plurality of commands, the data comprising an implied security question to a user of the user device and a response to the implied security question, wherein the implied security question is one of a plurality of security questions stored in the memory;

a processor configured to execute the plurality of commands and cause the system to:

receive from the user device a request to access a service, the request comprising a unique record identifier that is transmitted to the user device by a roaming device that is recognizable by the processor, the unique record identifier being encrypted between the server and the roaming device to be opaque to the user device;

establish a secure communication protocol with the user device when the unique record identifier is recognized by the system;

place a call to the user device within the secure communication protocol;

prompt the user to provide a voice response to the implied security question;

verify that the voice response matches a selected voice biometric record;

convert the voice response into a speech-to-text phrase; and compare the speech-to-text phrase against a stored secret text phrase to verify that the speech-to-text phrase matches the response to the implied security question.

13. A non-transitory, computer readable medium storing instructions which when executed by a processor in a server, cause the server to perform a method comprising:

receiving, by a server, an access request sent to a network address of a resource server from a user using a user device, the access request comprising a unique record identifier, wherein the unique record identifier is transmitted to the user device by a roaming device, is recognizable by the server, the unique record identifier being encrypted between the server and the roaming device to be opaque to the user device;

establishing a secure communication protocol between the user device and the server when the unique record identifier is recognized by the server;

placing a call to the user device using the secure communication protocol;

receiving from the user a voice response to a generic prompt associated with an implied security question for the user, wherein the implied security question is one of a plurality of security questions stored in a memory of the server;

verifying that the voice response of the user matches a selected voice biometrics record;

converting the voice response into a speech-to-text phrase; and comparing the speech-to-text phrase against a stored secret text phrase to verify that the speech-to-text phrase matches an answer to the implied security question.

* * * * *